(12) United States Patent
O'Malley, III et al.

(10) Patent No.: US 7,688,318 B2
(45) Date of Patent: Mar. 30, 2010

(54) REUSABLE DATA CONSTRUCTS FOR A MODELING SYSTEM

(75) Inventors: Austin J. O'Malley, III, Acton, MA (US); Parapura Thazathil Rajkumar, Cambridge, MA (US); Timothy D. Gallagher, Saugerties, NY (US); Bryson K. Kido, Aliso Viejo, CA (US); Vajrang Parvate, Ayer, MA (US)

(73) Assignee: Dassault Systemes Solidworks Corporation, Concord, MA (US)

( * ) Notice: Subject to any disclaimer, the term of this patent is extended or adjusted under 35 U.S.C. 154(b) by 589 days.

(21) Appl. No.: 11/670,820

(22) Filed: Feb. 2, 2007

(65) Prior Publication Data

US 2008/0188969 A1 Aug. 7, 2008

(51) Int. Cl.
*G06T 15/00* (2006.01)
(52) U.S. Cl. .................. 345/420; 700/95; 700/97; 700/182; 715/964
(58) Field of Classification Search ............ 345/420; 700/95, 97, 98, 182; 715/964
See application file for complete search history.

(56) References Cited

U.S. PATENT DOCUMENTS

| 6,721,614 B2 * | 4/2004 | Duncan et al. ............. 700/97 |
| 7,269,808 B2 * | 9/2007 | Bruce et al. ............... 716/5 |
| 2002/0008700 A1 | 1/2002 | Fuki |

FOREIGN PATENT DOCUMENTS

WO WO 2004/068300 A2 8/2004

OTHER PUBLICATIONS

Biasotti, S., et al., "Sub-Part Correspondence by Structural Descriptors of 3D Shapes," *Computer-Aided Design* 38(9), pp. 1002-1019 (Sep. 2006).
Cornelio A., et al., "Integration and Cataloging of Engineering Design Information," *Systems Integration '90, IEEE Comput., Soc.*, US, pp. 720-729 (Apr. 23, 1990).
Fonseca, M., et al., "Towards Content-Based Retrieval of Technical Drawings Through High-Dimensional Indexing," *Computers and Graphics* 27(1), pp. 61-69 (Feb. 2003).
Lee, K.S., et al., "Framework of an Evolutionary Design System Incorporating Design Information and History," *Computers in Industry* 44(3), pp. 205-227 (Apr. 2001).

(Continued)

*Primary Examiner*—Phu Nguyen
(74) *Attorney, Agent, or Firm*—Hamilton, Brook, Smith & Reynolds, P.C.

(57) ABSTRACT

Reusing design data in a computer-aided design model includes automatically analyzing a computer-aided design file to identify a set of elements, storing information corresponding to each element in a manner enabling querying and retrieval of the information, presenting one element in a user interface upon retrieval of the information corresponding to the one element, selecting the presented element for inclusion in the model, and constructing the model by incorporating the presented element in the model. The information identifies corresponding elements to facilitate reproduction of at least one element. The information is data indicating a location in the computer-aided design file or data defining at least one of the elements. The stored information allows querying and searching for elements matching a search criterion in a manner free of opening the design file.

20 Claims, 9 Drawing Sheets

OTHER PUBLICATIONS

Altmeyer, J., et al., "Reuse of Design Objects in CAD Frameworks," *IEEE/ACM International Conference on Computer-Aided Design, Digest of Technical Papers*, pp. 754-761 (Nov. 6, 1994).

Clark, D., et al., "Benchmarking Shape Signatures Against Human Perceptions of Geometric Similarity," *Computer-Aided Design* 38(9), pp. 1038-1051 (Sep. 2006).

* cited by examiner

REUSABLE DATA CONSTRUCTS FOR A MODELING SYSTEM

FIELD

This application relates to Computer-Aided Design (CAD), and more particularly, to the reuse of data constructs within a 3D CAD model.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. Parts and subassemblies may be used to design an assembly.

A solid modeling system may be a feature-based 3D CAD system wherein a part is constructed using various features. Examples of features include bosses, fillets, chamfers, cuts, holes, shells, lofts, and sweeps. Commercially available feature-based modeling systems include the SolidWorks® 2007 software system available from SolidWorks Corporation of Concord, Mass. SolidWorks software and other commercially available CAD systems store the contents of parts, subassemblies, and assemblies in a data file. In addition to features, the contents of CAD data files may include design profiles, layouts, internal components (e.g., bodies), and graphical entities.

Often, new or modified product designs evolve from existing designs, and thus, a design engineer constructs a model that has similar characteristics to a model that has previously been built. However, entities that make up the similar characteristics may not be readily available to use again in a design. The previously built model may be stored in a data file created by a legacy CAD system and not readable by a CAD system currently in use. On the other hand, the currently used CAD system may be able to read the data file created by a legacy system, but the contents of the data file may not be assessable in the granularity desired by the design engineer. Thus, the design engineer may need to construct the same data entities again in their entirety.

Some CAD systems, such as SolidWorks 2007 software, allow design engineers to specify design data that may be used for future designs. Once design data is specified, the design data may be organized for reuse, including for example, specifying and saving data as two-dimensional sketch blocks or library features. To reuse data stored as sketch blocks or library features, a design engineer must have the forethought that the data may be needed again in another design and must proactively specify the appropriate data for later use. Moreover, after saving the design data for reuse, the design data may only be used again after being located. Locating the saved design data may require using a file browser to conduct an extensive manual search in relevant CAD files for the saved data. Once the saved design data is located, the design engineer may select a name of a feature or sketch block and drag the name into the window area in which the part appears, at which time the saved data will graphically appear in the part.

In addition to feature libraries and sketch blocks, CAD systems may also provide feature recognition capabilities. In general, feature recognition capabilities are based on heuristics and identify features of a part created by a non-native CAD system. Moreover, feature recognition techniques do not necessarily capture the design intent because information on how a feature is created may be lacking. Feature recognition techniques may also be limited in scope. For example, a feature recognition process may only recognize features in a currently opened CAD file requiring the user to find the appropriate CAD file, open the file, and then initiate the feature recognition process.

Other methods of locating previously designed CAD data include search mechanisms. SolidWorks 2007 software provides a search mechanism using a textual search technique that locates a part file using a text string. However, the software accesses and opens the entire part rather than a specific entity therein. This is analogous to a web search technique that locates a web page given a text string and opens an entire web page that contains the text.

Time-saving advantages and enhancements to state of the art CAD systems could be achieved by providing an efficient means that allows design engineers to automatically locate needed design data whatever the granularity without having to first proactively save specific segments of design data for reuse, manually browse a file system for the specific segment of design data for reuse, and open the entire file that contains the reusable design data.

SUMMARY OF THE INVENTION

In general, in one aspect, the invention features a computer-implemented method for reusing design data in a computer-aided design model. A computer-aided design file is automatically decomposed into elements. To decompose the design file into elements, the computer-aided design file is analyzed to identify each element and information corresponding to each element is stored for later retrieval to reproduce one of the elements. The information is data that indicates a location in the design file of an element or data that explicitly defines an element. When information is retrieved, the corresponding elements are presented in a user interface. One of the elements presented can be selected and included in the computer-aided design model. Constructing the computer-aided design model includes incorporating the selected element in the computer-aided design model.

A search criterion determines the information to retrieve. In some embodiments, the search criterion specifies at least a filename and/or an element name; and the information retrieved is identified by the filename and/or the element name.

The plurality of elements includes any one of a feature, a profile, a sketch entity, a connected set of lines, a spline, a surface, and internal file property, a two-dimensional block, a drawing view, a layer, and an annotation. The internal file property specifies any one of a texture, a material, a bump map, a color, a configuration value, a numerical value, a text string, and a behavioral property.

The presentation of the corresponding elements in a user interface may include the display of a respective graphical image of each element and/or the display of filenames associated with the elements. The display of the graphical image may include rendering a part defined by the computer-aided design file in a transparency mode except the subject corresponding elements included in the part. A thumbnail image of the part may also be generated.

In one embodiment, a user selects one or more of the presented elements for inclusion in the computer-aided design model by graphical user interface operations, such as dragging the desired presented element from a user interface region and dropping the subject element into a modeling portion of a window.

In other embodiments, the invention method further includes the steps of storing tag data corresponding to an identified element, searching for the stored tag data to locate the identified element, retrieving the stored information corresponding to the identified element, and presenting a graphical image of the identified element in the user interface.

According to another embodiment, the present invention provides a computer-readable data storage medium comprising computer instructions for reusing design data in a computer-aided design model. The computer instructions cause a computer to execute a process that automatically identifies one or more computer-aided design components defined in a design file used for construction of a first computer-aided design model. Next the computer stores data for re-creating the computer-aided design components, wherein the stored data comprises a unique dataset associated with each of the computer-aided design components. The computer instructions further cause the computer to search the stored data for the unique dataset matching a search criterion without opening the design file. The computer presents as a reusable CAD entity the computer-aided design component associated with the unique dataset matching the search criterion. The computer allows for user selection of the reusable CAD entity.

The unique dataset associated with each one of the computer-aided design components may be a pointer to the computer-aided design component and/or a copy of the computer-aided design component. In turn, the computer instructions cause the computer to generate a copy of the reusable CAD entity upon user selection of the reusable CAD entity and to include the copy of the reusable CAD entity in a second computer-aided design model. Further, the computer presents the reusable CAD entity by displaying a graphical image of the reusable CAD entity and/or by displaying a filename associated with the reusable CAD entity. The computer instructions cause the computer to select the graphical image and/or the filename, search the stored data to locate one or more lower-level entities used to generate the reusable CAD entity, present the one or more lower-level entities, enable selection of one or more lower-level entities and include a selected one of the lower-level entities in the second computer-aided design model.

In some embodiments, the invention method or system distinguishes a kind of component during the process of automatically identifying computer-aided design components. A filter means filters the graphical image of the reusable CAD entity according to the kind of component. The filtered graphical image of the reusable CAD entity is then displayable. The kind of component or component types include a cut feature, an extruded feature, a sketch block, a drawing view, and a layer.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention enables design engineers of all experience levels to easily reuse design data. The reusable design data may be a low-level design construct such as a curve or a higher-level design construct such as a sub-assembly. The reusable design data may also be a design property, a graphical attribute such as a material appearance, a bitmap (e.g., a company logo), or an annotation. The present invention identifies reusable design data by decomposing a design document (e.g., a part, assembly, or drawing file). Extracting identified design data from a decomposed design document and organizing the extracted design data in searchable memory allows the design data to be easily incorporated into a new design.

Figure 1:
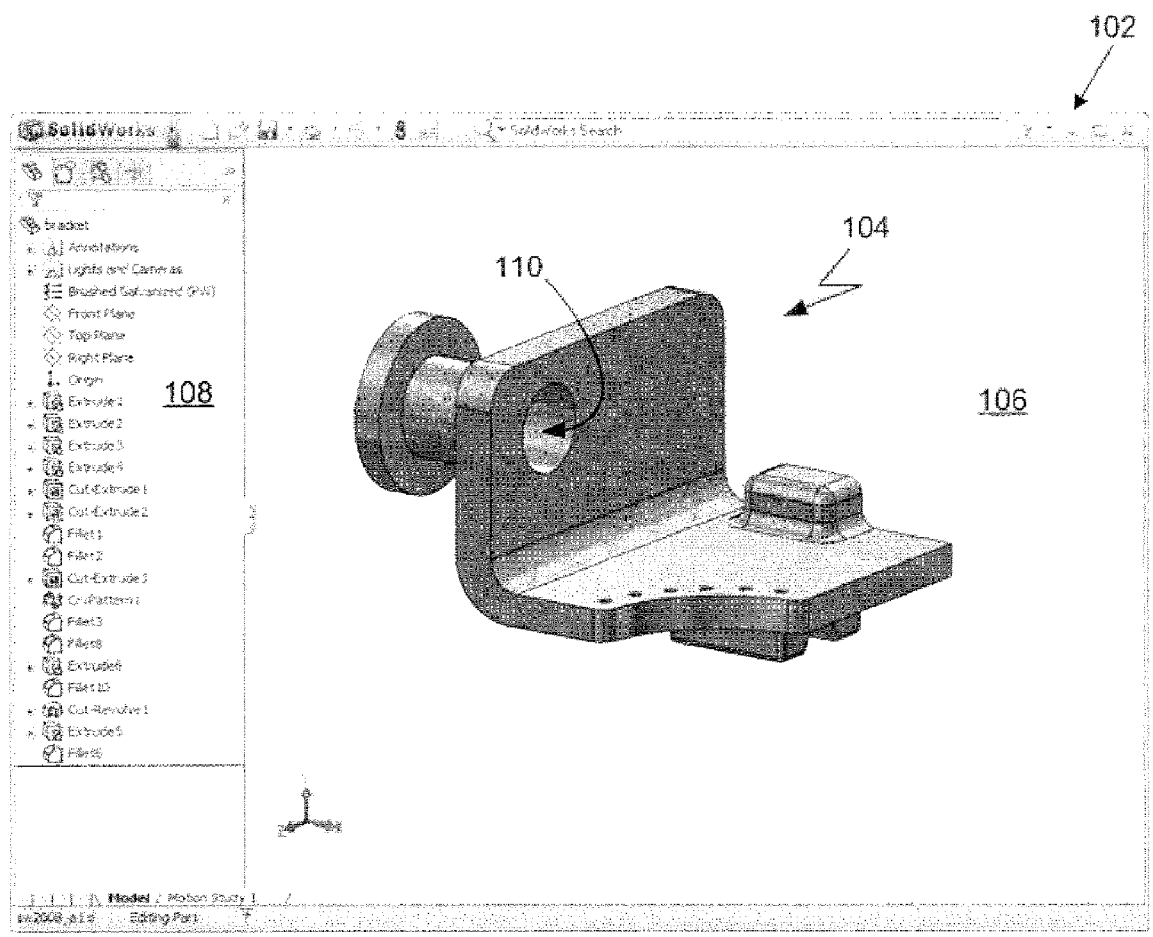
FIG. 1 is an illustration of a computer-generated model and a feature manager portion of the user interface displayed in a window in one embodiment of the present invention.

Referring now to FIG. 1, a window 102 displayed on a computer monitor is shown. The window 102 is generated by modeling software executed by a computerized modeling system, an example of which is later shown with reference to FIGS. 8 and 9. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. Among other design elements, the model 104 includes an extruded cut 110. Implementations of the present invention also may include other window areas, such as a FeatureManager® window panel 108 in which the structure of an opened component, assembly, or drawing is listed to help the design engineer visualize and manipulate the 3D model 104, as well as components of the 3D model 104. The FeatureManager window panel 108 may present the feature history to the design engineer as a hierarchical collection of features. The design engineer may be able to highlight a feature by selecting the name of the feature or an icon representing a feature in the FeatureManager window panel 108. U.S. Pat. No. 5,815,154 to Hirschtick et al discloses a system for modifying a model by allowing a user to graphically manipulate a hierarchical collection of features.

Figure 2:
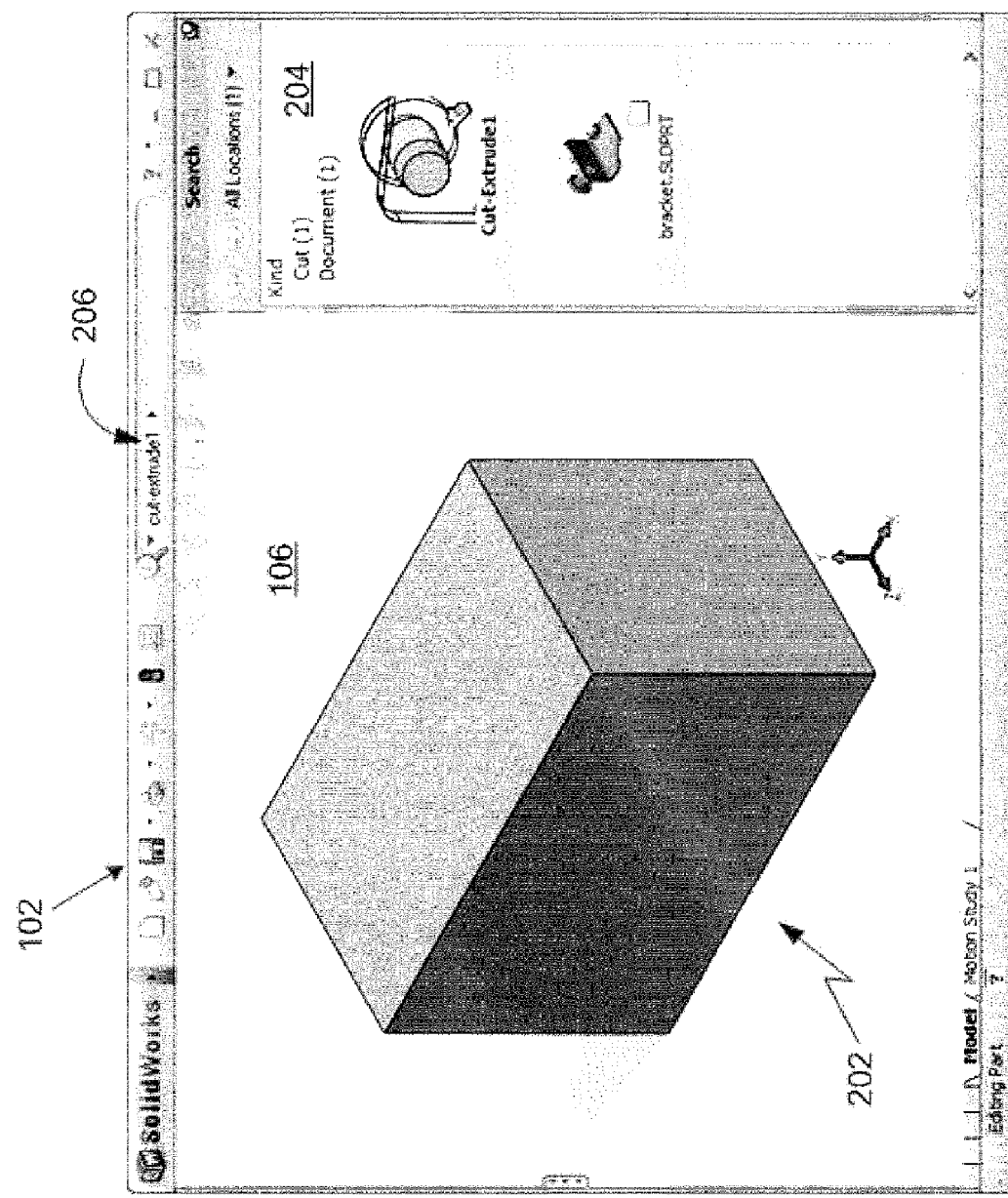
FIG. 2 is an illustration of a computer-generated model and the invention user interface containing a representation of the computer-generated model shown in FIG. 1 and a feature thereof.

Referring now to FIG. 2, a 3D model of an object 202 is shown in the window 102. The model of the object 202 may be used as a foundation for a new model. To reuse a previously designed CAD element that is a particular extruded cut, the design engineer may search for an extruded cut by typing extruded cut's name in a search window 206. The results of the search appear as thumbnail images in a search result panel 204. As shown in the search result panel 204, the feature named "Cut-Extrude1" and the model 104 that is shown in FIG. 1 and which contains the named feature, are displayed in the search result panel 204. The search result panel 204 informs the design engineer that two items were found—a cut feature and a document that contains the cut.

Figure 3:
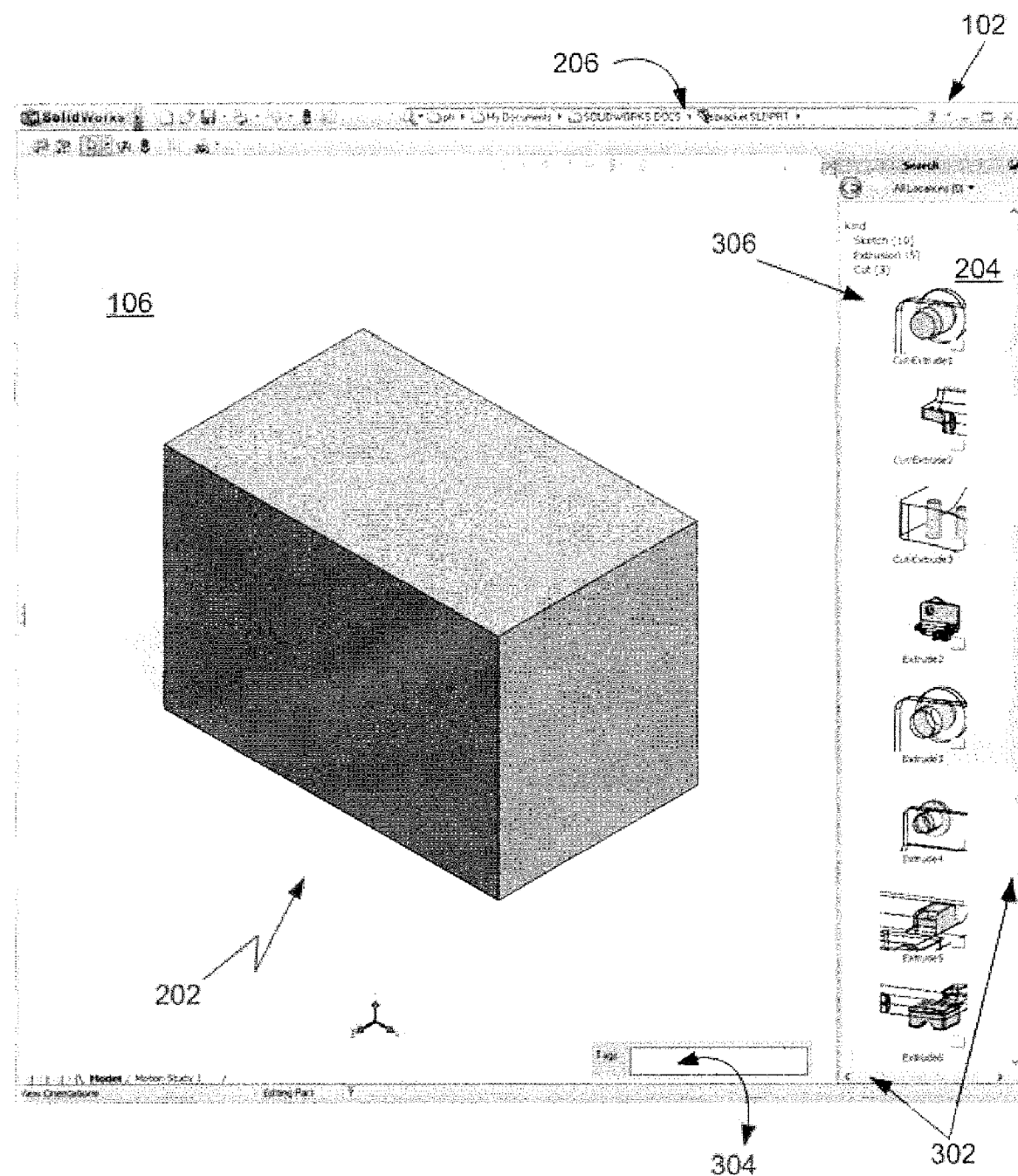
FIG. 3 is an illustration of a computer-generated model and the invention user interface.

As shown in FIG. 3, after a file document named bracket.SLDPRT is searched, the search result panel 204 displays thumbnail images of numerous features of model 104. Using a mouse, a thumbnail image may be dragged and dropped into the modeling portion 106 of the window 102 for reuse. When the search result panel 204 cannot accommodate all the images in the available space, scrollable bars 302 allow the design engineer to view more CAD elements returned by the search operation. Additionally, an implementation may arrange the results in pages and allow the design engineer to select a page to view in the search result panel 204. Moreover, the pages may be arranged depending on the types of CAD elements. For example, one page may show features, another page sketch entities, and yet another page annotations. The present invention may also display a tag window 304, as is shown in the lower part of the window 102 in FIG. 3. The tag window 304 enables the design engineer to associate meaningful text to a CAD element. For example, the Cut-Extrude1 feature 306 may be tagged with the text "standard connector." Text entered into the tag window 304 may later be used in a search specification to retrieve the CAD element.

Figure 4:
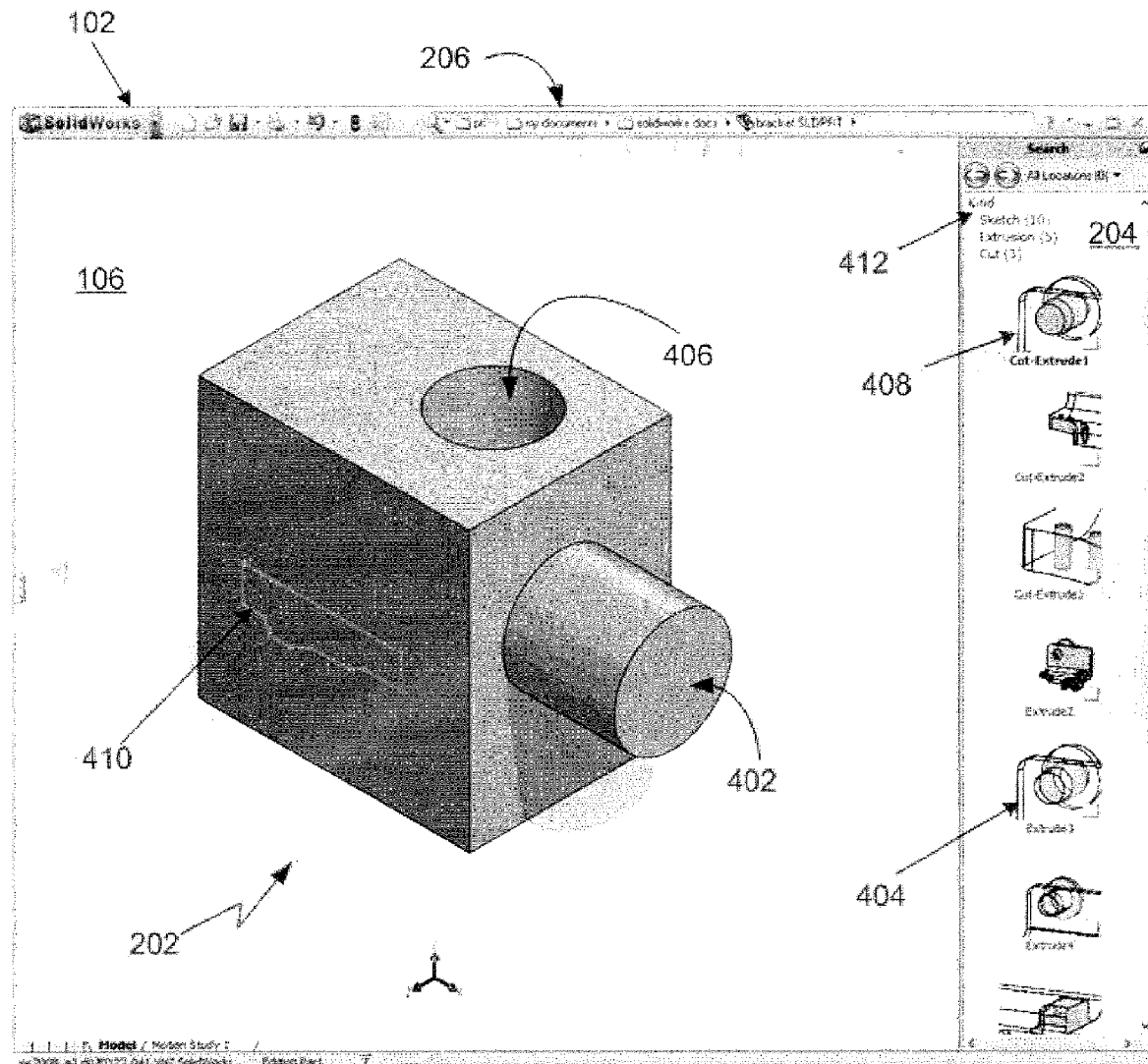
FIG. 4 is an illustration of the computer-generated model of FIG. 3 and the invention user interface containing representations of features from the computer-generated model shown in FIG. 1.
Figure 5:
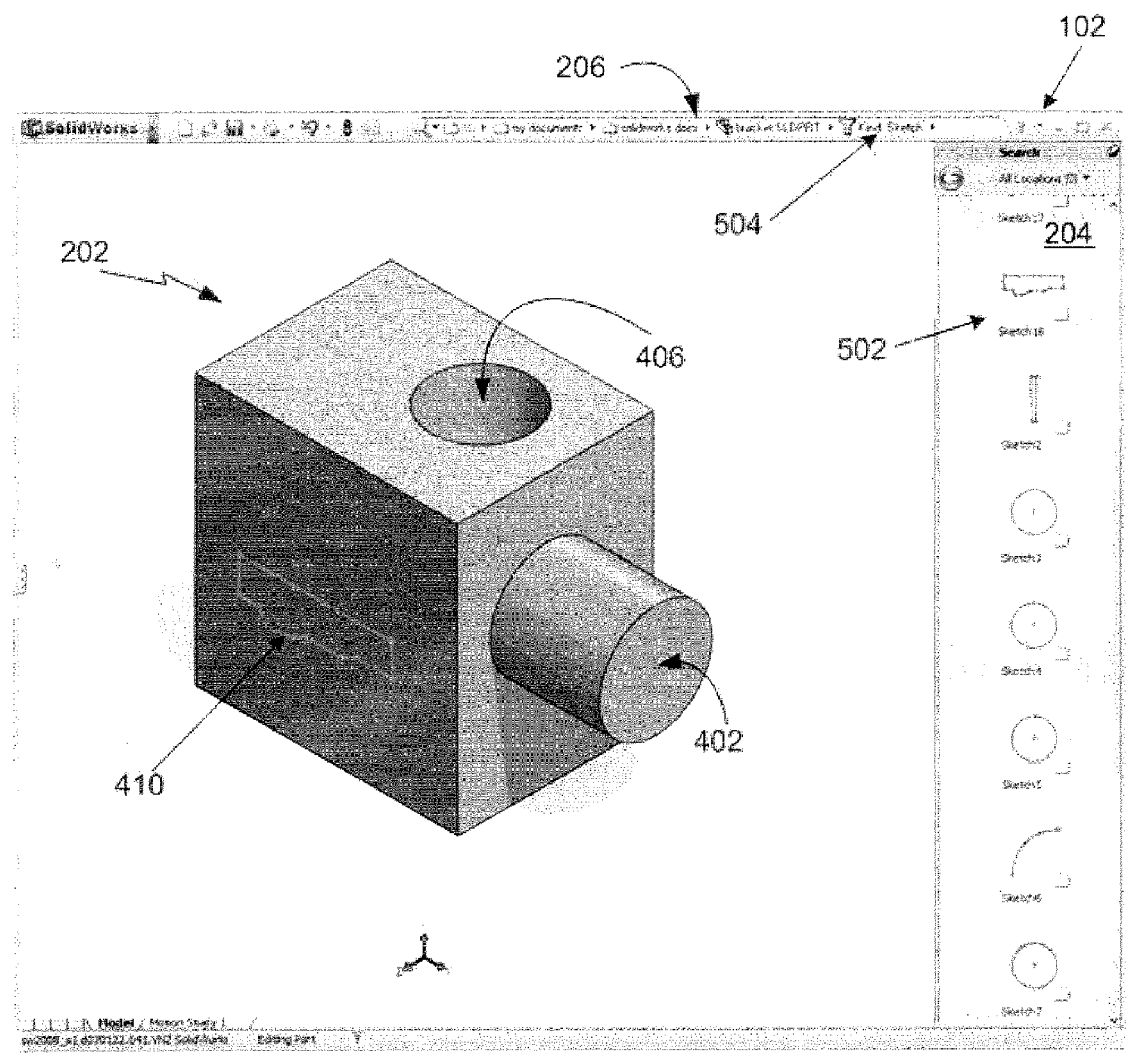
FIG. 5 is an illustration of the computer-generated model of FIG. 3 and the invention user interface containing representations of sketch entities from the computer-generated model of FIG. 1.

FIG. 4 and FIG. 5 show the model of the object 202 after the inclusion of additional CAD entities that are reusable according to embodiments of the present invention. The additional CAD entities are a cylinder 402, extruded cut 406, and a sketch entity 410. Referring to FIG. 4, the cylinder 402 and the extruded cut 406 were included in the model of the object 202 after the design engineer selected then dragged and dropped a corresponding image of the cylinder 404 and a corresponding image of the extruded cut 408, respectively, from the search result panel 204. The images of the CAD entities shown in the search result panel 204 in FIG. 4 represent the results of a search of a design document (i.e., a file) that defines a part named bracket.SLDPRT. As seen in the search window 206, the text "bracket.SLDPRT" was entered into the search window 206 to initiate the search process.

The CAD entity corresponding to the sketch entity 410 is not shown in FIG. 4 because the corresponding image of the sketch entity 502 is displayed on another page of the search results panel 204, as shown in FIG. 5. The present invention automatically collects information about CAD entities during a decomposition process. This information is then used to filter and rank results displayed in the search results panel 204. Referring back to FIG. 4, a filter identified three kinds of CAD entities in the bracket.SLDPRT document—Sketch, Extrusion, and Cut. Beside the identified kinds of entities is a numeral indicating the number of each entity type in the search results. To filter the search results, the design engineer may select a filter name in the upper area 412 of the search result panel 204. If the design engineer selects the text "Sketch" in the upper area 412, the sketches in bracket.SLDPRT document will be displayed, as shown in FIG. 5. The inclusion of sketch entity 410 in the model of the object 202 occurred after the corresponding image of the sketch entity 502 was selected and dragged from the search result panel 204 shown in FIG. 5 and dropped on the face 506. Moreover, the search window 206 in FIG. 5 reflects the entire search context by including the text "Kind: Sketch" to indicate that the kind of CAD entities displayed in the search results panel 204 are sketch entities. Essentially, the search window 206 is combination of a user interface file browser and a filter 504 to be applied to the results of a file browsing operation.

Figure 6:
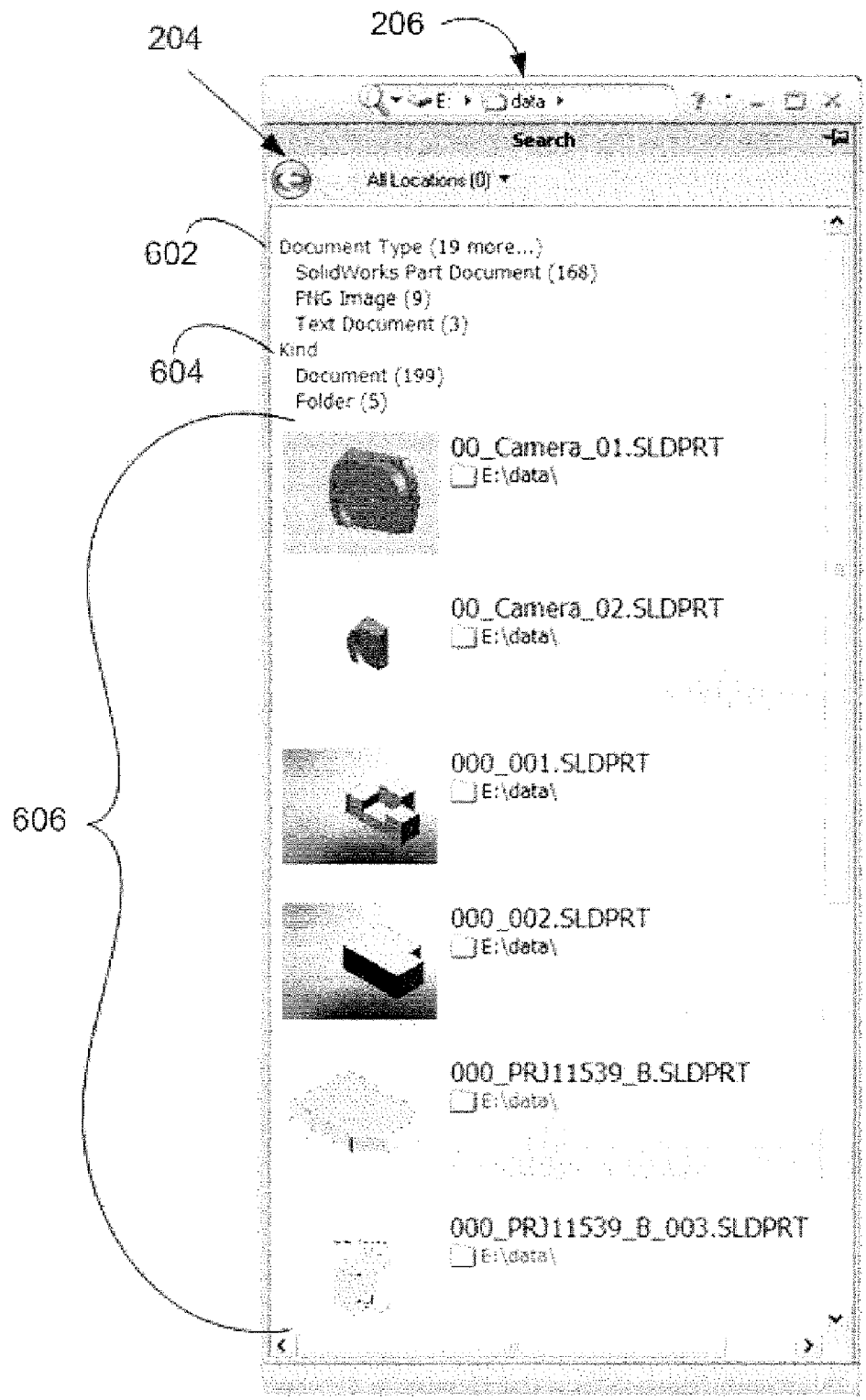
FIG. 6 is an illustration of the invention user interface and filters that may be applied to search results.

Referring now to FIG. 6, a search result panel 204 is shown. A search window 206 displayed above the search result panel 204 indicates that a folder named "data" located on a disk drive E was searched. To make the search results easier to comprehend, the present invention groups heterogeneous files and presents the groupings to the design engineer. A document type list 602 indicates that several document types were found, including 168 SolidWorks part documents. A kind list 604 indicates that the data folder on drive E contains 199 documents and five folders. In the lower portion of the search result panel 204, thumbnail images of SolidWorks part documents 606 are shown. Beside each thumbnail image is a filename.

An embodiment of the present invention automatically performs a search within a folder or a file when the design engineer double clicks a mouse button while pointing to a thumbnail image or corresponding filename in the search result panel 204. Double-clicking on a folder causes that folder to be searched, while double-clicking on a filename or image causes that file to be searched. Results from the search are then displayed in the search result panel 204. This pattern of behavior can occur with all entities that contain other entities capable of being decomposed thereby enabling a design engineer to drill down to basic entities in a CAD file. For example, double-clicking on a filename or image that is a part document causes that part document to be searched; search results are then displayed as thumbnail sketches and/or filenames in the search result panel 204. Likewise, double-clicking on a feature defined in a part document causes that feature to be searched and perhaps then causes thumbnail images of a sketches or blocks used to construct that feature to appear in the search result panel 204.

Figure 7:
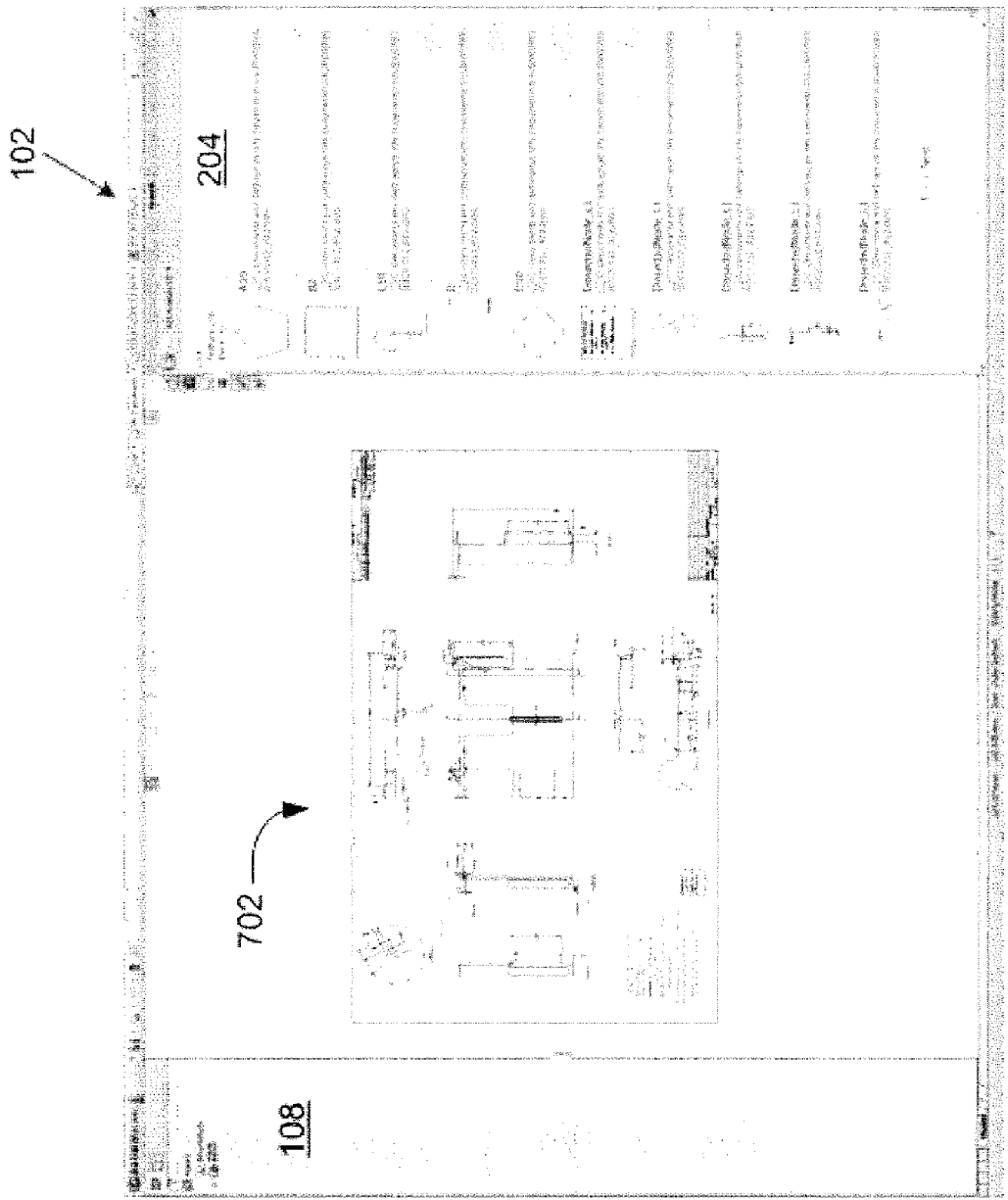
FIG. 7 is an illustration of a computer-generated drawing of a model and the invention user interface containing representations of design entities in the drawing.

As illustrated in FIG. 7, the present invention not only decomposes 3D part files, but additionally decomposes 2D drawing files for reuse in a new 2D drawing or in a 3D model. The window 102 shown in FIG. 7 contains a 2D drawing 702 and the search result panel 204. Not only are the images of 2D CAD entities displayed in the search result panel 204, the names of the files that define those entities are also displayed.

Figure 8:
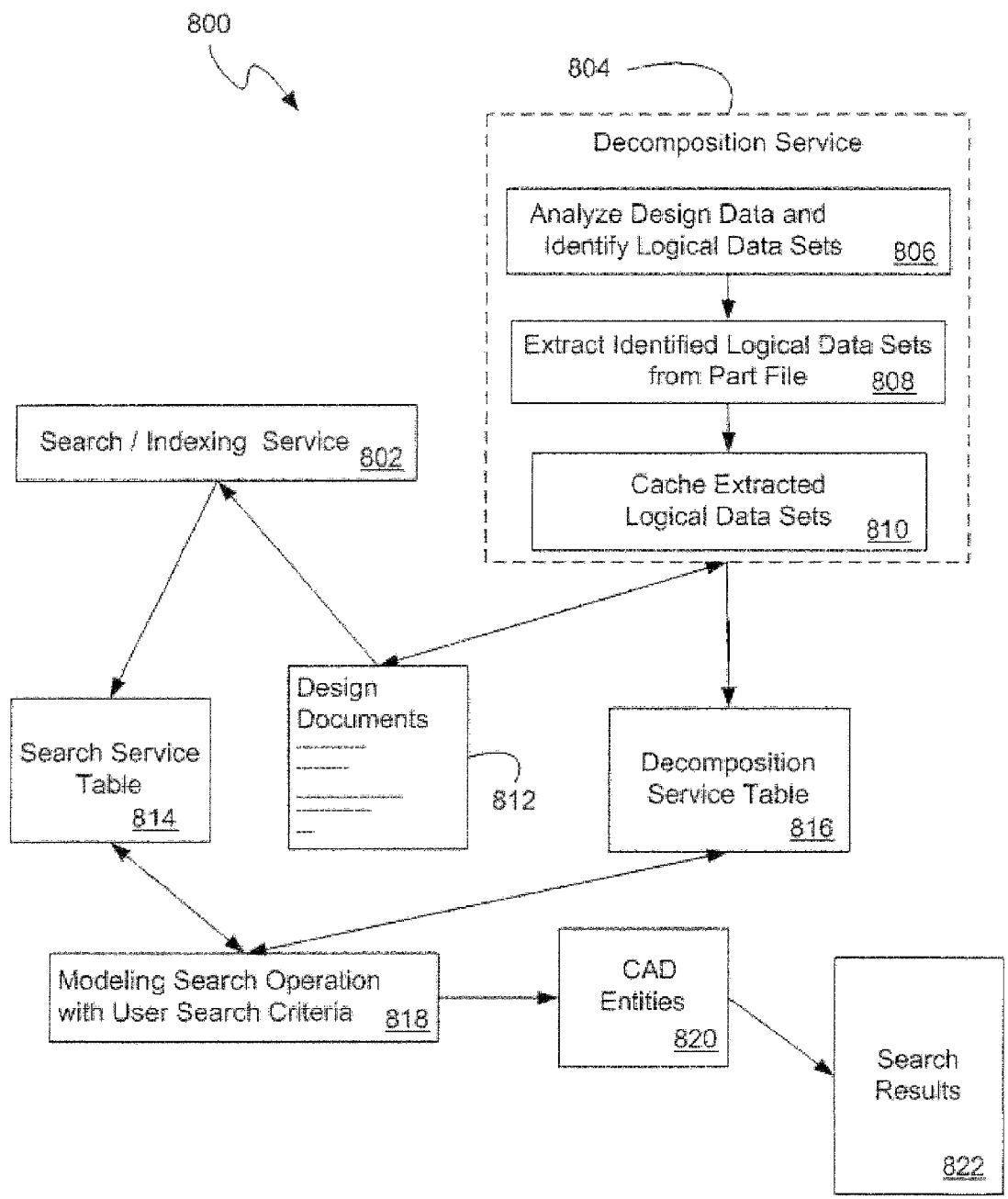
FIG. 8 is a schematic diagram depicting the data flow between components in an embodiment of the present invention.

FIG. 8 is a diagram of a framework 800 implemented by an embodiment of the present invention. The framework 800 enables the reuse of design data by automatically reducing designs stored in design documents to reusable CAD entities. No user intervention is required to reduce designs into reusable CAD entities. Two processes in the framework 800 run in the background of a modeling system. One background process is a search and indexing service 802. The search and indexing service 802 reads one or more design documents 812 (located on local or networked disks, or in cache memory) and creates a search service table 814 that provides links that optimize the retrieval of reusable design data. The links associate text strings with the design documents 812. Commercially available software such as Microsoft Windows Desktop Search may be used for the search and indexing service 802.

The second background process in the framework 800 is a decomposition service 804. A first component 806 of the decomposition service 804 decomposes one or more design documents 812 by performing a detailed analysis of the design data and identifying CAD entities, which are logical data sets. A CAD entity is a particular CAD element, and by way of non-limiting example may be a feature, a profile (which may be a sketch), an internal file property (e.g., a texture), a user-created table, a material, or an annotation. A CAD entity may also be a group of connected lines or a sketch block in a 2D drawing document.

The detailed analysis of the design data may employ numerous techniques and the techniques used are dependent on the document format. For example, one technique employs particular headers that identify CAD elements for known file formats. Another technique employs feature recognition methods to identify CAD features, which is useful for decomposing unknown file formats. Yet other techniques recognize data types to aid in the identification of tables, annotations, and dimensions. To identify 2D CAD elements, the detection of various line segments having common endpoints may reveal a CAD entity. Furthermore, drawing views may be discovered using methods such as those described in U.S. Pat. No. 6,603,486 to Baran et al. Moreover, 2D CAD elements such as layers and blocks may be identified using software libraries available through the Open Design Alliance.

A second component 808 of the decomposition service 804 performs an actual or a virtual extraction of each identified CAD entity. Whereas an actual extraction of the CAD entities creates a copy of each CAD entity, a virtual extraction does not reproduce any design data. Rather, pointers to the locations of each CAD entity are generated and stored in cached memory along with an indication of the byte size of the corresponding CAD entity.

A third component 810 of the decomposition service 804 caches the actual extracted CAD entities or the pointers and accompanying size data in a decomposition service table 816, which may reside in disk memory or in non-permanent memory. The decomposition service table 816 also stores other identifying information for each CAD entity, such as the file from which the particular CAD entity was extracted and parent-child relationships. The decomposition service table 816 is accessed when a design engineer initiates a modeling search operation 818.

The design engineer initiates a search by providing user search criteria to a modeling search process 818. The modeling search process locates one or more folders, files, or CAD elements identified in the search criteria. The modeling search process 818 finds the text (which by way of non-limiting example may be a pathname, a tag, or a feature name) in the search service table 814 and retrieves the names of files that meet the search criteria. Then, the modeling search process 818 looks up the names of the files retrieved from the search service table 814 in the decomposition service table 816 to locate the entities or pointers thereto 820 belonging to the named files. After the search process 818 locates the desired CAD entities 820, the CAD entities are presented to the design engineer as search results 822 such as in search results panel 204 discussed above in FIGS. 2-7.

The search results 822 are shown graphically, and may be displayed as thumbnail images. In an embodiment search results that are features are displayed by making the entire part in which the feature belongs transparent except the feature. Furthermore, a different color may be assigned to the feature to highlight the feature. The part is then sized such that only the feature and the immediate surrounding region of the feature fit in the area allotted for a thumbnail image.

As previously discussed, double clicking a CAD entity or the filename associated with the CAD entity initiates another search. Within the framework 800, the modeling search process 818 fetches information from the decomposition service table 816 only, to produce another set of entities or pointers thereto 820. Information does not need to be retrieved from the search service table 814 in this case. The other identifying information with each CAD entity (e.g., the file from which the particular CAD entity was extracted and parent-child relationships) is utilized to determine lower-level entities belonging to the CAD entity.

CAD entities displayed as search results 822 may be selected and incorporated in a new or an existing model. An intuitive means for accomplishing this is for the computerized modeling system to allow the design engineer to select, drag, and drop a CAD entity to incorporate that CAD entity in a model. If a selected CAD entity is a copy of an extracted CAD entity, then the selected CAD entity is simply included in the model. If a selected CAD entity is a pointer to the extracted CAD entity, then the selected CAD entity is created by locating the extracted CAD entity, extracting a specified amount of data (e.g., determined by byte size), and creating a copy of the extracted CAD entity to include in the model.

Figure 9:
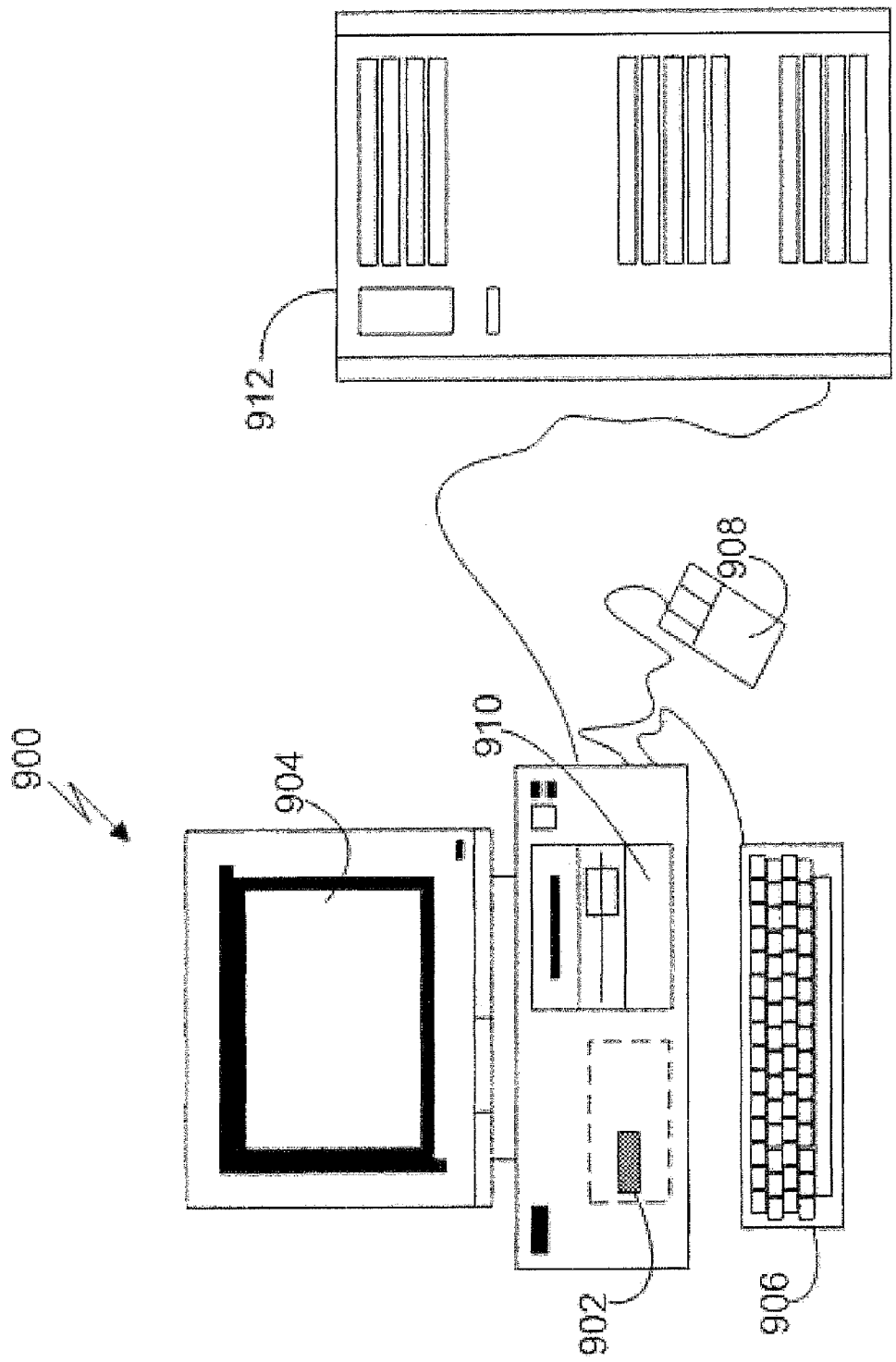
FIG. 9 is a schematic diagram of a computer system in which embodiments of the present invention are implemented.

Referring now to FIG. 9, a computerized modeling system 900 is shown and includes a CPU 902, a computer monitor 904, a keyboard input device 906, a mouse input device 908, and a storage device 910. The CPU 902, computer monitor 904, keyboard 906, mouse 908, and storage device 910 can include commonly available computer hardware devices. For example, the CPU 902 can include a Pentium-based processor. The mouse 908 may have conventional left and right buttons that the user may press to issue a command to a software program being executed by the CPU 902. As an alternative or in addition to the mouse 908, the computerized modeling system 900 can include a pointing device such as a trackball, touch-sensitive pad, or pointing device and buttons built into the keyboard 906. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 900. Furthermore, the computerized modeling system 900 may include network hardware and software thereby enabling communication to a hardware platform 912, and facilitating communication between numerous computer systems that include a CPU and a storage system, among other computer components.

Computer-aided modeling software of the present invention may be stored on the storage device 910 and loaded into and executed by the CPU 902. The modeling software allows a user to create and modify a 3D model and implements aspects of the invention described herein. The CPU 902 uses the computer monitor 904 to display a 3D model and other aspects thereof as described. Using the keyboard 906 and the mouse 908, the user can enter and modify data associated with the 3D model. The CPU 902 accepts and processes input from the keyboard 906 and mouse 908. The CPU 902 processes the input along with the data associated with the 3D model and makes corresponding and appropriate changes to that which is displayed on the computer monitor 904 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

An advantage of the present invention is that reusable design data can save organizations time, money, and opportunity costs. Given that a design engineer will not need to recreate many unchanged features, parts, and other CAD components, product cycle times may be shortened. Moreover, product branding features may be captured for reuse, such as specific curves and profiles that are identifiable within an overall product line. Additionally, CAD databases may represent a large investment for a company and allowing items in that database to be reused may increase the return on investment for the company.

Yet another advantage is that the present invention enhances collaboration between design engineers by providing a means to easily share data. A design engineer who recently joined a company can search significant amounts of design data with very little knowledge of how another design engineer created earlier designs. The present invention allows a design engineer to find, understand, and extract the appropriate data from files that that design engineer did not previously create.

Other advantages of the present invention include giving the design engineer the ability to find CAD parts and have design data within one or more of those CAD parts presented in an easily reusable way, and giving the design engineer the ability to readily reuse design data without the design engineer having to preprocess design data that may be useful later in the same model or in future models.

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. Particular user interface operations relative to a mouse (e.g., click, drag, drop, etc.) are by way of illustration and not limitation. Other user interface operations for selecting, moving, placing, etc. model or design data are suitable. Additionally, an embodiment may apply filters to the decomposition procedure to limit the number of CAD entities extracted.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for reusing design data in a computer-aided design model, the method comprising:
   (a) in a digital processor, automatically decomposing a computer-aided design file into a plurality of elements, each element being a logical data set of design data, wherein automatically decomposing comprises:
   analyzing the computer-aided design file to identify each of the plurality of elements; and
   storing in data storage information corresponding to each of the plurality of elements, wherein:
   the information identifies corresponding ones of the plurality of elements to facilitate reproduction of at least one of the plurality of elements; and
   the information is one of data indicating a location in the computer-aided design file and data defining at least one of the plurality of elements; and
   (b) querying the data storage to locate one of the plurality of elements;
   (c) retrieving the information from the data storage corresponding to the one of the plurality of elements;
   (d) presenting the one of the plurality of elements in a user interface;
   (e) responding to user selection of the presented one of the plurality of elements for inclusion in the computer-aided design model; and
   (f) constructing the computer-aided design model by incorporating the presented and selected one of the plurality of elements in the computer-aided design model
   wherein the steps of (a), (b), (c), (d), (e) and (f) are performed by a computerized modeling system.

2. The computer-implemented method of claim 1, wherein:
   a search criterion determines the information to retrieve; and
   the search criterion specifies at least one of a filename and an element name; and
   the information retrieved is identified by at least one of the filename and the element name.

3. The computer-implemented method of claim 1, wherein the plurality of elements includes any one of a feature, a profile, a sketch entity, a connected set of lines, a spline, a surface, an internal file property, a two-dimensional block, a drawing view, a layer, and an annotation.

4. The computer-implemented method of claim 3, wherein an internal file property specifies any one of a texture, a material, a bump map, a color, a configuration value, a numerical value, a text string, and a behavioral property.

5. The computer-implemented method of claim 1, wherein presenting the one of the plurality of elements further comprises at least one of displaying a graphical image of the presented one of the plurality of elements and displaying a filename associated with the presented one of the plurality of elements.

6. The computer-implemented method of claim 5, wherein displaying the graphical image comprises:
   rendering a part defined by the computer-aided design file in a transparency mode except the presented one of the plurality of elements included in the part; and
   generating a thumbnail image of the part.

7. The computer-implemented method of claim 1, wherein selecting the presented one of the plurality of elements for inclusion comprises dragging the presented one of the plurality of elements from a user interface region and dropping the presented one of the plurality of elements into a modeling portion of a window.

8. The computer-implemented method of claim 1, further comprising:
   storing tag data corresponding to an identified one of the plurality of elements;
   searching for the stored tag data to locate the identified one of the plurality of elements;
   retrieving the stored information corresponding to the identified one of the plurality of elements; and
   presenting a graphical image of the identified one of the plurality of elements in the user interface.

9. A computer-readable data storage medium comprising instructions for causing a computer to:
   execute a process that automatically identifies one or more computer-aided design components defined as respective logical data sets in a design file used for construction of a first computer-aided design model;
   store data for re-creating the computer-aided design components, wherein the stored data comprises a unique dataset associated with each one of the computer-aided design components;
   search the stored data for the unique dataset matching a search criterion without opening the design file;
   present a reusable CAD entity, wherein the reusable CAD entity is the computer-aided design component associated with the unique dataset matching the search criterion; and
   allow for user selection of the reusable CAD entity.

10. The data storage medium of claim 9, wherein the unique dataset associated with each one of the computer-aided design components comprises one of a pointer to the computer-aided design component and a copy of the computer-aided design component.

11. The data storage medium of claim 9, further comprising instructions for causing a computer to:
   generate a copy of the reusable CAD entity upon user selection of the reusable CAD entity; and
   include the copy of the reusable CAD entity in a second computer-aided design model.

12. The data storage medium of claim 9, wherein instructions for causing a computer to present the reusable CAD entity further comprises at least one of an instruction to display a graphical image of the reusable CAD entity and an instruction to display a filename associated with the reusable CAD entity.

13. The data storage medium of claim 12, further comprising instructions for causing the computer to:
   select one of the graphical image and the filename; and
   search the stored data to locate one or more lower-level entities used to generate the reusable CAD entity; and
   present the one or more lower-level entities;
   enable selection of one or more lower-level entities;
   include a selected one of the lower-level entities in a second computer-aided design model.

14. The data storage medium of claim 12, further comprising instructions for causing the computer to:
   distinguish a kind of component during the process that automatically identifies computer-aided design components; and
   filter the graphical image of the reusable CAD entity according to the kind of component; and
   display the graphical image of the reusable CAD entity only when applying a filter according to the kind of component.

15. The data storage medium of claim 14, wherein the kind of component is one of a cut feature, an extrude feature, a sketch, a sketch block, a drawing view, and a layer.

16. A computer-aided design system comprising:
   a processor operatively coupled to a data storage system, the data storage system storing a three-dimensional model; and
   a data storage memory operatively coupled to the processor and comprising instructions to configure the processor to:
   automatically decompose a computer-aided design file into a plurality of CAD entities, each CAD entity being a respective logical data set, wherein instructions to configure the processor to automatically decompose further comprises instructions to:
   analyze the computer-aided design file to identify each of the plurality of CAD entities; and
   store in a database information corresponding to each of the plurality of CAD entities for later retrieval to reproduce at least one of the plurality of CAD entities, wherein the information is one of data indicating a location in the computer-aided design file and data defining at least one of the plurality of CAD entities; and
   query the database to locate certain ones of the plurality of CAD entities;
   retrieve the information from the database corresponding to the certain ones of the plurality of CAD entities;
   present the certain ones of the plurality of CAD entities in a user interface upon retrieval of the information corresponding to the certain ones of the plurality of CAD entities;
   select reusable design data represented by one of the presented certain ones of the plurality of CAD entities for inclusion in the three-dimensional model; and construct the three-dimensional model by incorporating the selected reusable design data in the three-dimensional model.

17. The computer-aided design system of claim 16, wherein:
a search criterion determines the information to retrieve; and
the search criterion specifies at least one of a filename and a CAD entity name; and
the information retrieved is identified by at least one of the filename and the CAD entity name.

18. The computer-aided design system of claim 16, wherein the plurality of CAD entities includes any one of a feature, a profile, a sketch entity, a connected set of lines, a spline, a surface, an internal file property, a two-dimensional block, a drawing view, a layer, and an annotation.

19. The computer-aided design system of claim 16, further comprising instructions to configure the processor to:
render a plurality of graphical images, wherein each one of the plurality of graphical images corresponds to and is a rendering of a respective one of the plurality of CAD entities; and
filter the plurality of graphical images according to a kind of CAD entity; and
display ones of the filtered plurality of graphical images.

20. The computer-aided design system of claim 19, wherein instructions to configure the processor to render the plurality of graphical images further comprises instructions to configure the processor to:
render a part defined by the computer-aided design file in a transparency mode except the presented certain ones of the plurality of CAD entities; and
generate a thumbnail image of the part.

\* \* \* \* \*